(12) United States Patent
Kim

(10) Patent No.: US 9,088,024 B2
(45) Date of Patent: Jul. 21, 2015

(54) SECONDARY BATTERY

(75) Inventor: Dukjung Kim, Yongin-si (KR)

(73) Assignees: SAMSUNG SDI CO., LTD., Suwon-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 209 days.

(21) Appl. No.: 13/404,614

(22) Filed: Feb. 24, 2012

(65) Prior Publication Data

US 2012/0258356 A1 Oct. 11, 2012

(30) Foreign Application Priority Data

Apr. 7, 2011 (KR) .......................... 10-2011-0032032

(51) Int. Cl.
*H01M 2/06* (2006.01)
*H01M 2/08* (2006.01)
*H01M 2/22* (2006.01)
*H01M 10/04* (2006.01)

(52) U.S. Cl.
CPC ...... *H01M 2/06* (2013.01); *H01M 2/08* (2013.01); *H01M 2/22* (2013.01); *H01M 10/04* (2013.01)

(58) Field of Classification Search
CPC ......... H01M 10/04; H01M 2/08; H01M 2/06; H01M 2/22
USPC .......................................... 429/1–11, 47–255
See application file for complete search history.

(56) References Cited

U.S. PATENT DOCUMENTS

| 2006/0073382 | A1 | 4/2006 | Urano et al. | |
|---|---|---|---|---|
| 2009/0087733 | A1* | 4/2009 | Yoon et al. | ..................... 429/178 |
| 2010/0143789 | A1* | 6/2010 | Kim | .............................. 429/163 |
| 2010/0297484 | A1 | 11/2010 | Kim | |

FOREIGN PATENT DOCUMENTS

| JP | 2005-032477 A | 2/2005 |
|---|---|---|
| JP | 2009-181898 A | 8/2009 |
| KR | 10 2006-0051749 A | 5/2006 |
| KR | 10 2010-0125163 A | 11/2010 |
| KR | 10 2012-0010092 A | 2/2012 |
| KR | 10-2012-0039975 A | 4/2012 |
| KR | 10 2012-0046387 A | 5/2012 |

OTHER PUBLICATIONS

Korean Notice of Allowance in KR 10-2011-0032032, dated Feb. 4, 2013 (Kim).
Korean Office Action in KR 10-2011-0032032, dated Aug. 7, 2012 (Kim).

* cited by examiner

*Primary Examiner* — Jonathan Jelsma
*Assistant Examiner* — Omar Kekia
(74) *Attorney, Agent, or Firm* — Lee & Morse, P.C.

(57) ABSTRACT

A secondary battery including an electrode assembly; a collecting plate electrically connected to the electrode assembly; a case accommodating the electrode assembly and the collecting plate; a cap plate coupled with the case; an electrode terminal electrically connected to the collecting plate, the electrode terminal extending through the cap plate; and an insulation cover member covering regions of the electrode terminal and the collecting plate, the regions of the electrode terminal and the collecting plate being between the cap plate and the electrode assembly.

20 Claims, 8 Drawing Sheets

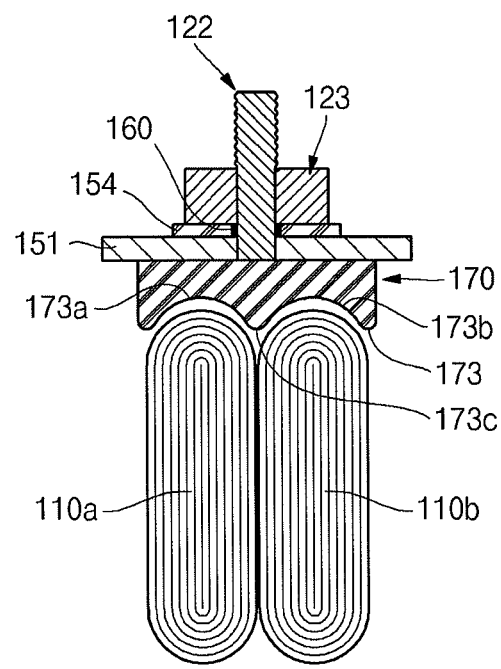

SECONDARY BATTERY

BACKGROUND

1. Field

Embodiments relate to a secondary battery.

2. Description of the Related Art

Secondary batteries are rechargeable, unlike primary batteries. Secondary batteries may include a low capacity battery including a battery cell in the form of a pack may be used for small portable electronic devices, e.g., cellular phones and camcorders. A high capacity battery including dozens of battery cells connected to one another may be used as a motor-driving power source for electric scooters, hybrid vehicles, or electric vehicles.

Secondary batteries may be manufactured in various shapes, e.g., a cylindrical shape and a prismatic shape. A secondary battery may be manufactured as follows: an electrode assembly formed by disposing an insulating separator between a positive electrode plate and a negative electrode plate is placed in a case together with electrolyte, and a cap plate is disposed on the case. The electrode assembly may be connected to positive and negative terminals which protrude from the cap plate and are exposed to the exterior of the electrode assembly.

SUMMARY

Embodiments are directed to a secondary battery.

The embodiments may be realized by providing a secondary battery including an electrode assembly; a collecting plate electrically connected to the electrode assembly; a case accommodating the electrode assembly and the collecting plate; a cap plate coupled with the case; an electrode terminal electrically connected to the collecting plate, the electrode terminal extending through the cap plate; and an insulation cover member covering regions of the electrode terminal and the collecting plate, the regions of the electrode terminal and the collecting plate being between the cap plate and the electrode assembly.

The collecting plate may include a head part connected to the electrode terminal; and a support part, the support part being bent from the head part, extending in a first direction, and being electrically connected to the electrode assembly.

The insulation cover member may include a fixing part fitted around the support part of the collecting plate; and an accommodation part extending from the fixing part and accommodating the electrode terminal and the head part of the collecting plate.

The fixing part may include an outer wall part, and first and second sidewall parts, sides of the first and second sidewall parts being connected to ends of the outer wall part, and other sides of the first and second sidewall parts being connected to the accommodation part, and the support part of the collecting plate may be in a space surrounded by the outer wall part and the first and second sidewall parts.

The accommodation part may include an accommodation recess, the electrode terminal and the head part of the collecting plate being coupled with the accommodation recess.

The accommodation recess may include at least one stepped part.

The accommodation part may include a guide recess connected to the accommodation recess, and a side of the head part of the collecting plate may be fixed to the guide recess.

A first surface of the accommodation part may include at least one protrusion thereon.

The cap plate may include at least one coupling recess therein, the coupling recess being coupled with the at least one protrusion, and a number and shape of the at least one coupling recess may correspond to a number and shape of the at least one protrusion.

A second surface of the accommodation part may include at least one fixing surface thereon, the at least one fixing surface corresponding to an outer surface of the electrode assembly.

The second surface of the accommodation part may include a positioning protrusion thereon, the positioning protrusion being between neighboring fixing surfaces.

The secondary battery may further include a sealing member between the electrode terminal and the cap plate.

The sealing member may include a body part having a planar plate shape, the body part including a penetration hole through which the electrode terminal extends; and a protrusion extending from the penetration hole in a second direction opposite to the first direction, the protrusion surrounding the electrode terminal.

The body part may further include at least one sub body part extending outwardly from the body part.

The sealing member may include at least one ridge and at least one furrow arranged around the penetration hole.

The electrode terminal may include a plate-shaped connection part contacting the head part of the collecting plate; and a column part protruding from the connecting part and extending through the cap plate, and the body part of the sealing member may have a shape corresponding to a shape of the connection part.

The sealing member may be formed of rubber.

BRIEF DESCRIPTION OF THE DRAWINGS

The embodiments will become apparent to those of ordinary skill in the art by describing in detail exemplary embodiments with reference to the attached drawings, in which:

FIGS. 7A and 7B illustrate sectional views of insulation cover members of secondary batteries according to embodiments.

DETAILED DESCRIPTION

Figure 1:
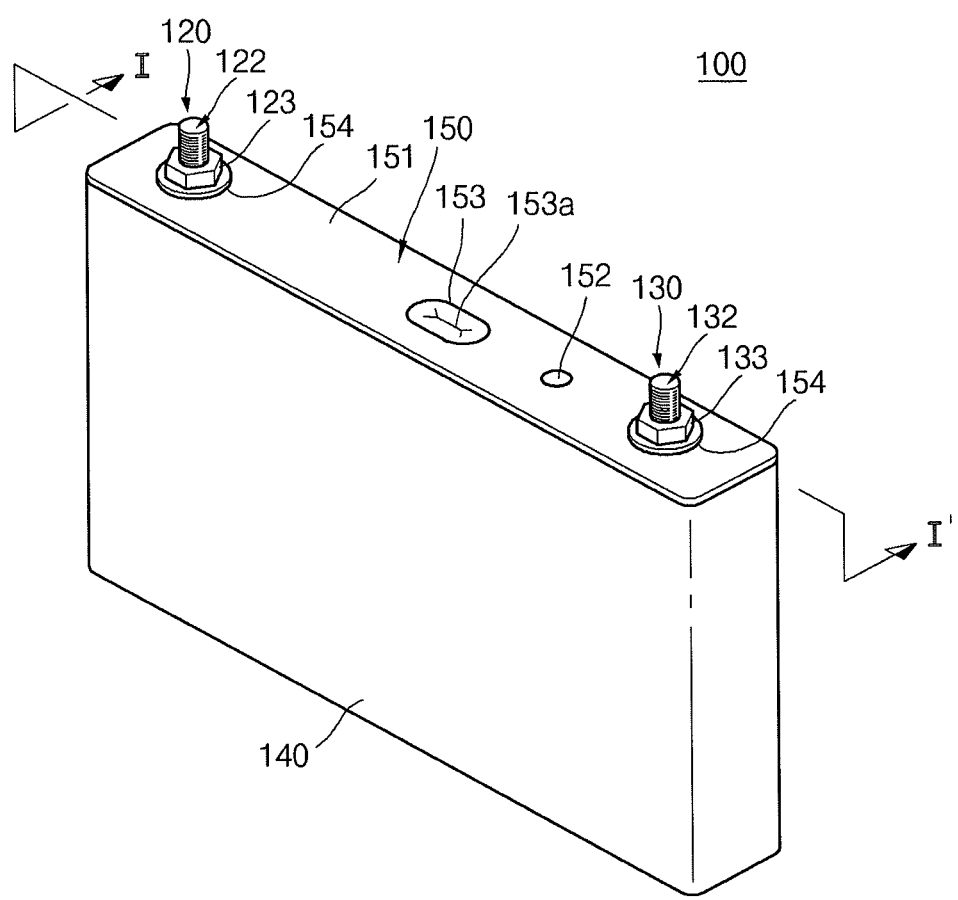
FIG. 1 illustrates a perspective view of a secondary battery according to an embodiment.

Korean Patent Application No. 10-2011-0032032 filed on Apr. 7, 2011, in the Korean Intellectual Property Office, and entitled: "secondary battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Figure 2:
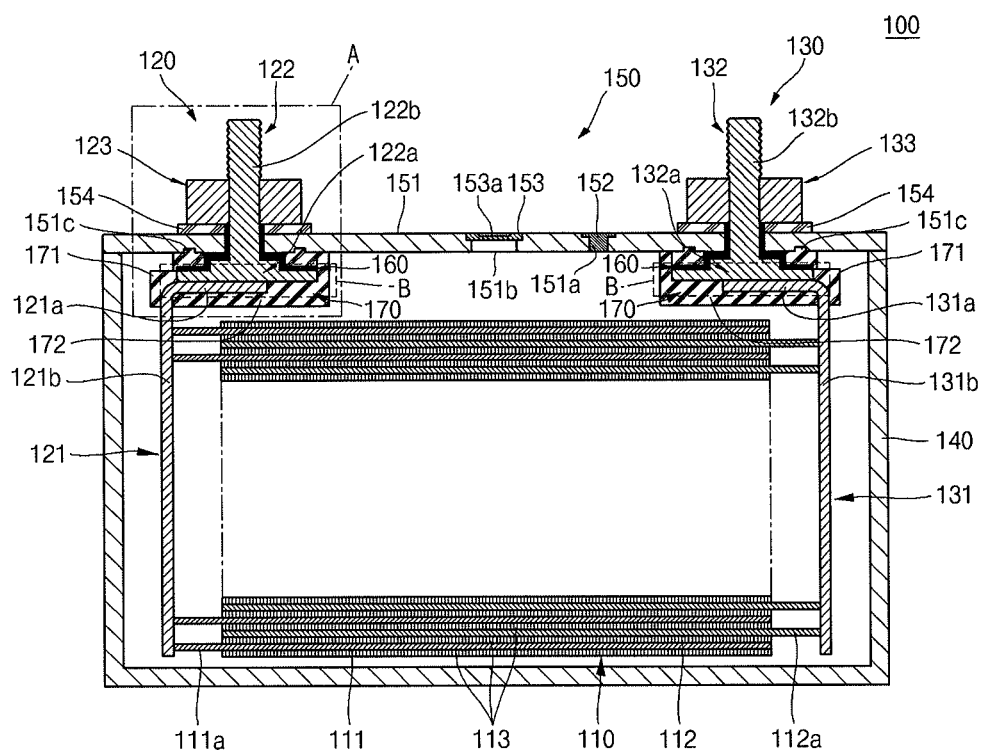
FIG. 2 illustrates a sectional view of the secondary battery taken along line I-I' of FIG. 1.
Figure 3:
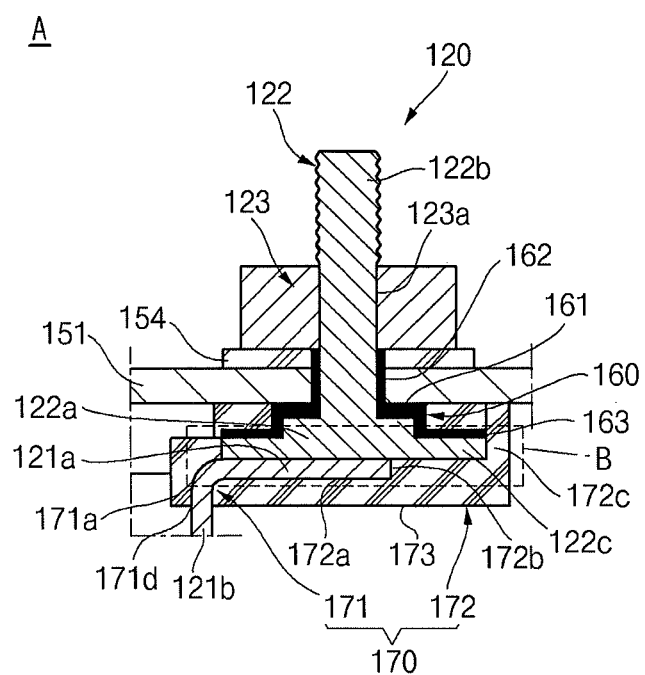
FIG. 3 illustrates an enlarged sectional view of a portion A of FIG. 2.
Figure 4:
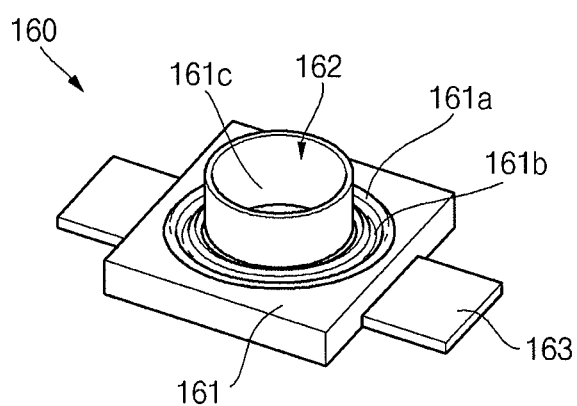
FIG. 4 illustrates a perspective view of a sealing member of the secondary battery of FIG. 1.
Figure 5:
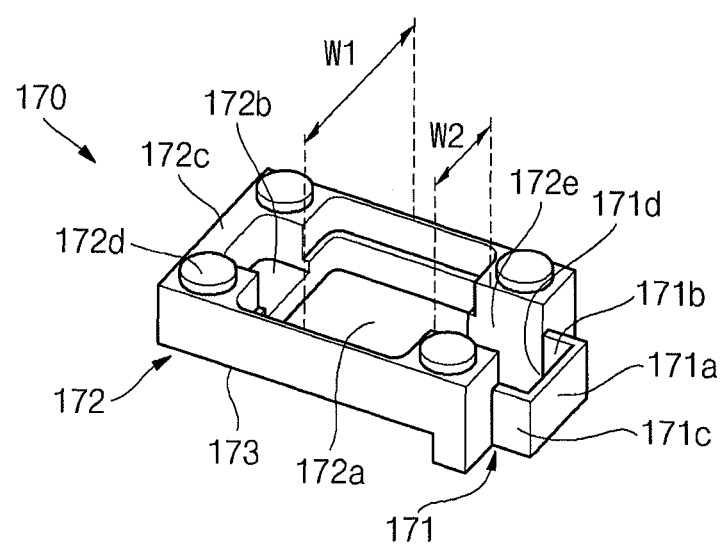
FIG. 5 illustrates an enlarged perspective view of an insulation cover member of the secondary battery of FIG. 1.

FIG. 1 illustrates a perspective view of a secondary battery according to an embodiment. FIG. 2 illustrates a sectional view of the secondary battery taken along line I-I' of FIG. 1. FIG. 3 illustrates an enlarged sectional view of a portion A of FIG. 2. FIG. 4 illustrates a perspective view of a sealing member of the secondary battery of FIG. 1. FIG. 5 illustrates an enlarged perspective view of an insulation cover member of the secondary battery of FIG. 1.

Referring to FIGS. 1 through 5, a secondary battery 100 of the current embodiment may include an electrode assembly 110, a first terminal assembly 120, a second terminal assembly 130, a case 140, a cap assembly 150, a sealing member 160, and insulation cover members 170.

The electrode assembly 110 may be formed by winding or stacking a first electrode plate 111, a separator 113, and a second electrode plate 112, which have a thin plate or film shape. The first electrode plate 111 may function as a negative electrode; and the second electrode plate 112 may function as a positive electrode. Alternatively, the first electrode plate 111 and the second electrode plate 112 may function oppositely.

The first electrode plate 111 may be formed by applying a first electrode active material, e.g., graphite or carbon, to a first electrode collector formed of metal foil, e.g., copper or nickel foil. The first electrode plate 111 may include a first electrode non-coating portion 111a to which the first electrode active metal is not applied. The first electrode non-coating portion 111a may function as a current flow passage from the first electrode plate 111 to outside of the electrode assembly 110. In the current embodiment, materials that may be used to form the first electrode plate 111 are not limited to the above-mentioned materials.

The second electrode plate 112 may be formed by applying a second electrode active material, e.g., a transition metal oxide, to a second electrode collector formed of metal foil, e.g., aluminum foil. The second electrode plate 112 may include a second electrode non-coating portion 112a to which the second electrode active metal is not applied. The second electrode non-coating portion 112a may function as a current flow passage from the second electrode plate 112 to outside of the electrode assembly 110. In the current embodiment, materials that may be used to form the second electrode plate 112 are not limited to the above-mentioned materials.

The polarities of the first and second electrode plates 111 and 112 may be changed with each other. For example, the polarities of the first and second electrode plates 111 and 112 may be reversed depending upon a charging/discharging condition of the secondary battery 100.

The separator 113 may be disposed between the first electrode plate 111 and the second electrode plate 112 to reduce the likelihood of or prevent a short circuit and to facilitate movement of lithium ions. The separator 113 may be formed of a polyethylene film, a polypropylene film, or a film including polyethylene and polypropylene. In the current embodiment, materials that may be used to form the separator 113 are not limited to the above-mentioned materials.

The first and second terminal assemblies 120 and 130 may be coupled with lateral end parts of the electrode assembly 110 in a manner such that the first and second terminal assemblies 120 and 130 are electrically connected to the first and second electrode plates 111 and 112, respectively.

The electrode assembly 110 may be accommodated in the case 140 together with an electrolyte. The electrolyte may include an organic solvent, e.g., ethylene carbonate (EC), propylene carbonate (PC), diethyl carbonate (DEC), ethyl methyl carbonate (EMC), and dimethyl carbonate (DMC); and a lithium salt, e.g., $LiPF_6$ or $LiBF_4$. The electrolyte may be liquid, solid, or gel.

The first terminal assembly 120 may be formed of a metal or an equivalent thereof and may be electrically connected to the first electrode plate 111. The first terminal assembly 120 may include a first collecting plate 121, a first electrode terminal 122, and a first terminal plate 123.

The first collecting plate 121 may contact the first electrode non-coating portion 111a (protruding from a lateral end of the electrode assembly 110). The first collecting plate 121 may include a head part 121a and a support part 121b. The head part 121a may be connected to the first electrode terminal 122. For example, the head part 121a may be welded to a bottom surface of the first electrode terminal 122. The support part 121b may be bent from the head part 121a and may extend in a first direction (downward direction). The support part 121b may be electrically connected to the first electrode non-coating portion 111a. The first collecting plate 121 may be formed of, e.g., copper or a copper alloy. However, the material of the first collecting plate 121 is not limited thereto.

The first electrode terminal 122 may be inserted through, e.g., may pass through, a cap plate 151 (described below) of the cap assembly 150 and may protrude upwardly by a predetermined length. The first electrode terminal 122 may be electrically connected to the first collecting plate 121 at a lower side of the cap plate 151. The first electrode terminal 122 may include a connection part 122a and a column part 122b. The connection part 122a may have a plate shape and may be in contact with the head part 121a of the first collecting plate 121. The connection part 122a may be welded to the head part 121a of the first collecting plate 121. Sub connection parts 122c may extend from sides of the connection part 122a. The column part 122b may protrude from the connection part 122a and may penetrate the cap plate 151. For example, the column part 122b may extend from the connection part 122a and may protrude from a top side of the cap plate 151 by a predetermined length. An upper part of the column part 122b may be fixed by the first terminal plate 123. For example, the upper part of the column part 122b of the first electrode terminal 122 may be coupled with the first terminal plate 123 (described below) and may be fixed by riveting. The first electrode terminal 122 may be electrically insulated from the cap plate 151 by a sealing member 160 (described below). The first electrode terminal 122 may be formed of one of, e.g., copper, a copper, and an equivalent thereof. However, the material of the first electrode terminal 122 is not limited to such materials.

The first terminal plate 123 may have a hexagonal shape; and a terminal penetration hole 123a may vertically extend through a center of the first terminal plate 123 so that the first electrode terminal 122 may be inserted through and coupled with the first terminal plate 123. The first terminal plate 123 may be formed of one of stainless steel, copper, copper alloy, aluminum, aluminum alloy, and an equivalent thereof. However, the material of the first terminal plate 123 is not limited thereto. The first terminal plate 123 and the cap plate 151 may be insulated from each other by an upper insulation member 154 (described below).

The second terminal assembly 130 may be formed of a metal or an equivalent thereof and may be electrically connected to the second electrode plate 112. The second terminal assembly 130 may include a second collecting plate 131, a second electrode terminal 132, and a second terminal plate 133. The second terminal assembly 130 may have the same shape and structure as those of the first terminal assembly 120. Thus, repeated descriptions thereof will are omitted. The second collecting plate 131 and the second electrode terminal 132 may be formed of one of, e.g., aluminum, an aluminum alloy, and an equivalent thereof. However, materials that may be used for forming the second collecting plate 131 and the second electrode terminal 132 are not limited to the listed materials. The second terminal plate 133 may be formed of one of stainless steel, aluminum, aluminum alloy, copper, copper alloy, and an equivalent thereof. However, the material of the second terminal plate 133 is not limited thereto.

In an implementation, the second terminal plate 133 may be electrically connected to the cap plate 151. In this case, the case 140 and the cap plate 151 may have the same polarity (e.g., positive polarity) as that of the second terminal assembly 130.

The case 140 may be formed of a conductive metal, e.g., aluminum, aluminum alloy, or steel plated with nickel. The case 140 may have an approximately hexahedral shape with an opening so that the electrode assembly 110, the first terminal assembly 120, and the second terminal assembly 130 may be inserted and accommodated in the case 140.

The cap assembly 150 may be coupled with the case 140. The cap assembly 150 may include the cap plate 151, a plug 152, a safety vent 153, and the upper insulation members 154.

The cap plate 151 may close the opening of the case 140. The cap plate 151 may be formed of the same material as that used to form the case 140. One or more coupling recesses 151*c* (see FIG. 6) may be formed in a bottom surface of the cap plate 151 so that protrusions 172*d* of the insulation cover members 170 may be coupled with the coupling recesses 151*c*. The insulation cover members 170 may be coupled with the first collecting plate 121 and the second collecting plate 131 (which covers the first electrode terminal 122, the first collecting plate 121, the second electrode terminal 132, and the second collecting plate 131). As described above, the cap plate 151 may have the same polarity as that of the second terminal assembly 130. In this case, the cap plate 151 and the case 140 may have the same polarity.

The plug 152 may close an electrolyte injection hole 151*a* of the cap plate 151. A safety vent 153 may be disposed on a vent hole 151*b* of the cap plate 151; and a notch 153*a* may be formed in the safety vent 153 so that the safety vent 153 may be opened in response to a preset pressure.

The upper insulation members 154 may be disposed on the cap plate 151 and may insulate the first and second terminal plates 123 and 133 from the cap plate 151. The upper insulation members 154 may be in tight contact with the cap plate 151 and the sealing members 160. In an implementation, the upper insulation members 154 may be formed of polyphenylene sulfide (PPS). However, the material of the upper insulation members 154 is not limited thereto.

The sealing members 160 may be formed of an insulating material and may be disposed between the cap plate 151 and the first and second electrode terminals 122 and 132 to seal gaps therebetween. The sealing members 160 may be disposed on the bottom surface of the cap plate 151 to insulate the first and second electrode terminals 122 and 132 and the first and second collecting plates 121 and 131 therefrom. For example, the sealing members 160 may be disposed between the cap plate 151 and the first and second electrode terminals 122 and 132 and may extend along the bottom surface of the cap plate 151 over exposed top surfaces of the first and second electrode terminals 122 and 132 and the first and second collecting plates 121 and 131. The sealing member 160 may be formed to reduce the likelihood of and/or block leakage of a conductive fluid such as electrolyte). Therefore, the sealing members 160 may prevent an unnecessary and undesirable short circuit between the electrode assembly 110 and the cap plate 151, between the electrode assembly 110 and the first and second collecting plates 121 and 131, and/or between the electrode assembly 110 and the first and second electrode terminals 122 and 132. In addition, the sealing members 160 may reduce or prevent permeation of moisture into the secondary battery 100 and leakage of electrolyte from the inside of the secondary battery 100.

Each of the sealing members 160 may include a body part 161 and a protrusion 162. The body part 161 may have a planar plate shape; and a penetration hole 161*c* may be formed in the body part 161 to receive the first electrode terminal 122 or the second electrode terminal 132. At least one ridge 161*a* and at least one furrow 161*b* may be repeatedly formed on a top surface of the body part 161 around the penetration hole 161*c*. Coupling grooves (not shown) corresponding to the ridge 161*a* and the furrow 161*b* may be formed in a bottom surface region of the cap plate 151 (that contacts the body part 161) around the penetration hole 161*c*. The body parts 161 may have a shape corresponding to the shape of connection parts 122*a* and 132*a* of the first and second electrode terminals 122 and 132. For example, if the connection part 122*a* of the first electrode terminal 122 includes the sub connection parts 122*c*, the body part 161 may include sub body parts 163 corresponding to the sub connection parts 122*c* of the connection part 122*a*. In an implementation, the body part 161 may have a shape corresponding to the shape of the connection part 122*a* in order to achieve tight contact between the bottom surface of the body part 161 and the top surface of the connection part 122*a*. The protrusion 162 may extend in a second direction (upward direction, e.g., opposite to the first direction) to surround the first electrode terminal 122 or the second electrode terminal 132. For example, the protrusion 162 may be coupled with the first electrode terminal 122 or the second electrode terminal 132 by bringing the protrusion 162 into tight contact with an outer surface of the first electrode terminal 122 or the second electrode terminal 132.

The sealing members 160 may be formed of, e.g., rubber, fluororesin, and/or PPS. However, the material of the sealing members 160 is not limited thereto.

The insulation cover members 170 may cover regions (B) of the electrode terminals 122 and 132 and the collecting plates 121 and 131 (located between the cap plate 151 and the electrode assembly 110). For example, the insulation cover members 170 may cover the regions (B) where the electrode terminals 122 and 132 and the collecting plates 121 and 131 are connected in the case 140. The insulation cover members 170 may be fixed to the bottom surface of the cap plate 151. For example, the insulation cover members 170 may have a cover shape. Thus, damage to the electrode assembly 110 (by the first electrode terminal 122, the first collecting plate 121, the second electrode terminal 132, and/or the second collecting plate 131) may be reduced or prevented.

For example, each of the insulation cover members 170 may include a fixing part 171 and an accommodation part 172. The fixing part 171 may be fitted around support parts 121b and 131b of the first and second collecting plates 121 and 131. The fixing part 171 may include an outer wall part 171a and first and second sidewall parts 171b ad 171c. A side of the first and second sidewall parts 171b and 171c may be connected to ends of the outer wall part 171a; and another side of the first and second sidewall parts 171b and 171c may be connected to the accommodation part 172. Therefore, the support part 121b or 131b of the first or second collecting plate 121 or 131 may be inserted in a space 171d of the fixing part 171 (surrounded by the outer wall part 171a and the first and second sidewall parts 171b and 171c). The accommodation part 172 may extend from the fixing part 171 and may accommodate the first or second electrode terminal 122 or 132 and the head part 121a or 131a of the first or second collecting plate 121 or 131. The accommodation part 172 may include an accommodation recess 172a for coupling with the first or second electrode terminal 122 or 132 and the head part 121a or 131a of the first or second collecting plate 121 or 131. At least one stepped part 172b and 172c may be formed at the accommodation recess 172a. The connection parts 122a and 132a of the first and second electrode terminals 122 and 132 may be welded to the head parts 121a and 131a of the first and second collecting plates 121 and 131. The welded portions may be accommodated in the accommodation recess 172a of the accommodation part 172. The welded portions (between the connection parts 122a and 132a of the first and second electrode terminals 122 and 132 and the head parts 121a and 131a of the first and second collecting plates 121 and 131) may be different in size. As noted above, the at least one stepped part 172b and 172c may be formed at each of the accommodation recesses 172a of the accommodation parts 172. Thus, the welded portions between the connection parts 122a and 132a of the first and second electrode terminals 122 and 132 and the head parts 121a and 131a of the first and second collecting plates 121 and 131 may be in tight contact with the accommodation recess 172a, even though the welded portions are different in size. Guide recesses 172e may be formed in the accommodation parts 172 and may be connected to the accommodate recesses 172a so that sides of the head parts 121a and 131a of the first and second collecting plates 121 and 131 may be fixed to the guide recesses 172e. For example, sides of the head parts 121a and 131a (close to the support parts 121b and 131b) may be fixed to the guide recesses 172e. A width W2 of the guide recesses 172e may be equal to or smaller than a width W1 of the accommodation recesses 172a.

One or more protrusions 172d may be disposed on a first surface (top surface) of each of the accommodation parts 172. The protrusions 172d may be coupled with the coupling recesses 151c in the bottom surface of the cap plate 151. The protrusions 172d may have a shape corresponding to the shape of the coupling recesses 151c.

At least one fixing surface (see 173a and 173b of FIGS. 7A and 7B) corresponding to an outer surface of the electrode assembly 110 may be located on a second surface (bottom surface 173) of each of the accommodation parts 172. Relative movement of the electrode assembly 110 may be reduced or prevented by the fixing surface 173a. If desired, a positioning protrusion 173b (see FIG. 7B) may be formed between neighboring fixing surfaces 173a and 173b.

If the secondary battery 100 is impacted, the electrode assembly 110 may be relatively moved in the case 140. Thus, the electrode assembly 110 may be brought into contact with a relatively hard corner of a part disposed under the cap plate 151. Then, the electrode assembly 110 could be deformed or damaged. However, according to an embodiment, the bottom surface 173 of the accommodation part 172 of the insulation cover member 170 may be shaped to correspond to the outer surface of the electrode assembly 110 so as to prevent or reduce the likelihood of the electrode assembly 110 from being deformed or damaged. The shape of the bottom surface of the accommodation part 172 will be described below in more detail with reference to FIGS. 7A and 7B.

As described above, in the secondary battery of the present embodiment, the insulation cover members may be disposed at the bottom side of the cap plate in a manner such that the insulation cover members may be coupled with the collecting plates and cover the electrode terminals and the collecting plates. Therefore, even in the event that the secondary battery falls or is impacted, the electrode assembly may not be directly brought into contact with a relatively hard part. Thus, damage to or deformation of the electrode assembly by the impact may be reduced or prevented.

Figure 6:
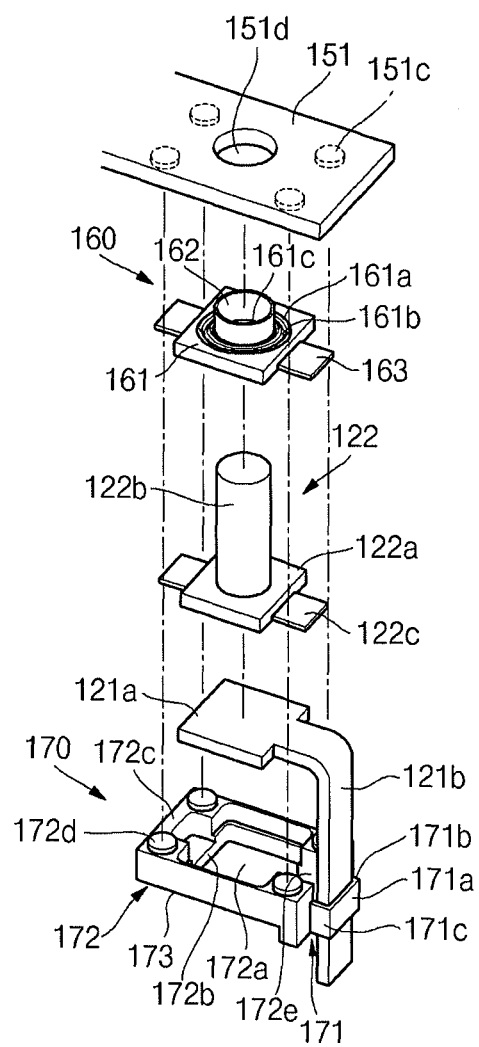
FIG. 6 illustrates an exploded perspective view showing a coupling method of the secondary battery of of FIG. 1.

FIG. 6 illustrates an exploded perspective view showing a coupling method of the secondary battery 100 of FIG. 1.

As shown in FIG. 6, in the secondary battery 100 of the present embodiment, the sealing member 160 may be between the electrode terminal 122 and the cap plate 151; and the insulation cover member 170 may be under the cap plate 151 (in a manner such that the insulation cover member 170 is coupled to the collecting plate 121 and covers the electrode terminal 122 and the collecting plate 121). Assembling one of the two terminal assemblies 120 and 130 of the secondary battery 100 will now be mainly described.

First, the fixing part 171 of the insulation cover member 170 may be coupled with the support part 121b of the collecting plate 121. For example, the support part 121b of the collecting plate 121 may be inserted in the fixing part 171 of the insulation cover member 170 until the insulation cover member 170 reaches a region of the support part 121b bent toward the head part 121a. At this time, a side of the head part 121a (close to the support part 121b) may be coupled with the guide recess 172e of the insulation cover member 170.

The head part 121a of the collecting plate 121 may be coupled with the accommodation recess 172a of the insulation cover member 170. At this time, the head part 121a of the collecting plate 121 may be coupled with the accommodation recess 172a of the insulation cover member 170 in a state where the connection part 122a and the sub connection parts 122c of the electrode terminal 122 are welded to the top surface of the head part 121a of the collecting plate 121. One of the sub connection parts 122c (extending from sides of the connection part 122a) may be coupled with the stepped part 172b of the accommodation recess 172a.

The column part 122b of the electrode terminal 122 may be inserted in and extend through the penetration hole 161c of the body part 161 of the sealing member 160. The protrusion 162 of the sealing member 160 may be inserted in and extend through a terminal penetration hole 151d of the cap plate 151. In addition, the protrusions 172d (on the top surface of the accommodation part 172 of the insulation cover member 170) may be fixedly coupled with the coupling recesses 151c (in the bottom surface of the cap plate 151).

Figure 7A:
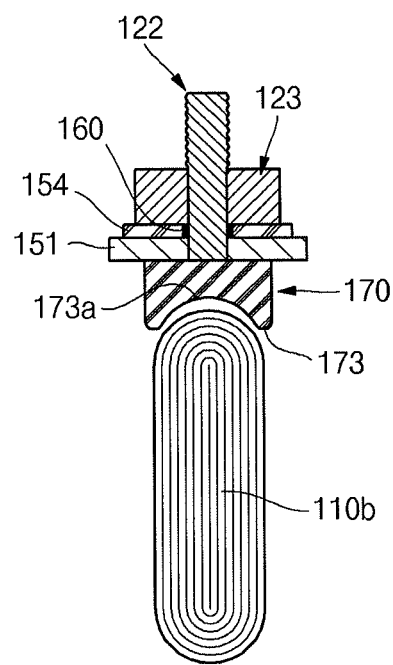

FIGS. 7A and 7B illustrate sectional views of insulation cover members of secondary batteries according to embodiments.

In the embodiment shown in FIG. 7A, a secondary battery may include only one electrode assembly 110b. In the secondary battery of the present embodiment, a fixing surface 173a (shaped like the outer surface of the one electrode assembly 110b) may be formed on a bottom surface 173 of an accommodation part 172 of an insulation cover member 170. If the electrode assembly 110b were to be relatively moved, the fixing surface 173a may be brought into contact with the outer surface of the electrode assembly 110b. Thus, further movement of the electrode assembly 110b may be reduced or prevented. For example, if the outer surface of the electrode assembly 110b is rounded, the fixing surface 173a may also have a rounded shape for holding the electrode assembly 110 and protecting the electrode assembly 110 from an impact. That is, the shape of the fixing surface 173a may be variously changed according to the shape of the outer surface of the electrode assembly 110b.

In the embodiment shown in FIG. 7B, a secondary battery may include a plurality of electrode assemblies 110a and 110b. In the secondary battery of the present embodiment, a plurality of fixing surfaces 173 (shaped like outer surfaces of the electrode assemblies 110a and 110b) may be formed on a bottom surface 173 of an accommodation part 172 of an insulation cover member 170. A positioning protrusion 173c may be formed between the neighboring fixing surfaces 173a and 173b. The positioning protrusion 173c may determine positions of the electrode assemblies 110a and 110b. The fixing surfaces 173a and 173b may contact outer surfaces of the electrode assemblies 110a and 110b and may fix positions of the electrode assemblies 110a and 110b. The fixing surfaces 173a and 173b may be formed according to the number of the electrode assemblies 110a and 110b. The shapes of the neighboring fixing surfaces 173a and 173b may be variously changed according to the shapes of the outer surfaces of the electrode assemblies 110a and 110b.

As described above, in the secondary battery of the embodiments, the bottom surface of the insulation cover member covering the electrode terminal and the collecting plate may be shaped according to the shape of the outer surface of the electrode assembly. Thus, the electrode assembly may be held more firmly by the bottom surface of the insulation cover member.

As described above, in the secondary battery of the embodiments, the insulation cover member may cover regions of the electrode terminal and the collecting plate that are located between the cap plate and the electrode assembly. Therefore, even if the secondary battery falls and/or is impacted, the electrode assembly may not be directly brought into contact with a relatively hard part. Thus, damage or deformation of the electrode assembly by the impact may be reduced or prevented.

Furthermore, in the secondary battery of the embodiments, the bottom surface of the insulation cover member covering the electrode terminal and the collecting plate may be shaped like the outer surface of the electrode assembly. Therefore, the electrode assembly may be held more firmly by the bottom surface of the insulation cover member.

Furthermore, in the secondary battery of the embodiments, the sealing member may be between the electrode terminal and the cap plate. Therefore, owing to the sealing by the sealing member, permeation of contaminants into the secondary battery may be reduced or prevented, and an unnecessary or undesirable internal short circuit caused by electrolyte may be reduced or prevented.

The embodiments provide a secondary battery in which an insulation cover member covers regions of an electrode terminal and a collecting plate (that are located between a cap plate and an electrode assembly) so as to reduce or prevent deformation to and/or damage of the electrode assembly caused by collision thereof with the electrode terminal and/or the electrode plate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   an electrode assembly;
   a collecting plate electrically connected to the electrode assembly, the collecting plate including a head part;
   a case accommodating the electrode assembly and the collecting plate;
   a cap plate coupled with the case;
   an electrode terminal electrically connected to the collecting plate via a coupled portion, the coupled portion including a connection part of the electrode terminal coupled to the head part of the collecting plate, and the electrode terminal extending through the cap plate; and
   an insulation cover member including an accommodation recess, the coupled portion being disposed in the accommodation recess of the insulation cover member, and the head part of the collecting plate being between the insulation cover member and the cap plate,
   wherein the insulation cover member covers regions of the electrode terminal and the collecting plate, the regions of the electrode terminal and the collecting plate being between the cap plate and the electrode assembly.

2. The secondary battery as claimed in claim 1, wherein the collecting plate includes:
   the head part connected to the electrode terminal; and
   a support part, the support part being bent from the head part, extending in a first direction, and being electrically connected to the electrode assembly.

3. The secondary battery as claimed in claim 2, wherein the insulation cover member includes:
   a fixing part fitted around the support part of the collecting plate; and
   an accommodation part extending from the fixing part and accommodating the electrode terminal and the head part of the collecting plate, the accommodation part including the accommodation recess.

4. The secondary battery as claimed in claim 3, wherein:
   the fixing part includes:
      an outer wall part, and
      first and second sidewall parts, sides of the first and second sidewall parts being connected to ends of the outer wall part, and other sides of the first and second sidewall parts being connected to the accommodation part, and
   the support part of the collecting plate is in a space surrounded by the outer wall part and the first and second sidewall parts.

5. The secondary battery as claimed in claim 3, wherein the connection part of the electrode terminal and the head part of the collecting plate are coupled with the accommodation recess.

6. The secondary battery as claimed in claim 5, wherein the accommodation recess includes at least one stepped part.

7. The secondary battery as claimed in claim 5, wherein:
   the accommodation part includes a guide recess connected to the accommodation recess, and a side of the head part of the collecting plate is fixed to the guide recess.

8. The secondary battery as claimed in claim 5, wherein a first surface of the accommodation part includes at least one protrusion thereon.

9. The secondary battery as claimed in claim 8, wherein:
the cap plate includes at least one coupling recess therein, the coupling recess being coupled with the at least one protrusion, and
a number and shape of the at least one coupling recess correspond to a number and shape of the at least one protrusion.

10. The secondary battery as claimed in claim 5, wherein a second surface of the accommodation part includes at least one fixing surface thereon, the at least one fixing surface corresponding to an outer surface of the electrode assembly.

11. The secondary battery as claimed in claim 10, wherein the second surface of the accommodation part includes a positioning protrusion thereon, the positioning protrusion being between neighboring fixing surfaces.

12. The secondary battery as claimed in claim 2, further comprising a sealing member between the electrode terminal and the cap plate.

13. The secondary battery as claimed in claim 12, wherein the sealing member includes:
a body part having a planar plate shape, the body part including a penetration hole through which the electrode terminal extends; and
a protrusion extending from the penetration hole in a second direction opposite to the first direction, the protrusion surrounding the electrode terminal.

14. The secondary battery as claimed in claim 13, wherein the body part further includes at least one sub body part extending outwardly from the body part.

15. The secondary battery as claimed in claim 13, wherein the sealing member includes at least one ridge and at least one furrow arranged around the penetration hole.

16. The secondary battery as claimed in claim 13, wherein:
the electrode terminal includes:
a plate-shaped connection part contacting the head part of the collecting plate; and
a column part protruding from the connecting part and extending through the cap plate, and
the body part of the sealing member has a shape corresponding to a shape of the connection part.

17. The secondary battery as claimed in claim 12, wherein the sealing member is formed of rubber.

18. The secondary battery as claimed in claim 1, wherein the insulation cover member further includes a bottom surface under the accommodation recess, the bottom surface supporting the coupled portion such that the bottom surface of the insulation cover member is between the coupled portion and the electrode assembly.

19. The secondary battery as claimed in claim 18, wherein the bottom surface is shaped to correspond to an outer surface of the electrode assembly.

20. A secondary battery, comprising:
an electrode assembly;
a collecting plate electrically connected to the electrode assembly, the collecting plate including a head part;
a case accommodating the electrode assembly and the collecting plate;
a cap plate coupled with the case;
an electrode terminal, the electrode terminal extending through the cap plate; and
an insulation cover member including an accommodation recess and a bottom surface of the accommodation recess, the head part of the collecting plate being between the insulation cover member and the cap plate,
wherein the head part of the collecting plate and a portion of the electrode terminal are coupled together and disposed in the accommodation recess, and the bottom surface is between the head part of the collecting plate and the electrode assembly.

* * * * *